(12) United States Patent
Demont (10) Patent No.: US 10,131,246 B2
(45) Date of Patent: Nov. 20, 2018

(54) COMMUNICATION SYSTEM FOR BATTERY MANAGEMENT SYSTEMS IN ELECTRIC OR HYBRID VEHICLES

(71) Applicant: H55 SA, Sion (CH)

(72) Inventor: Sébastien Demont, Les Agettes (CH)

(73) Assignee: H55 SA, Sion (CH)

( * ) Notice: Subject to any disclaimer, the term of this patent is extended or adjusted under 35 U.S.C. 154(b) by 0 days.

(21) Appl. No.: 15/943,579

(22) Filed: Apr. 2, 2018

(65) Prior Publication Data

US 2018/0290556 A1 Oct. 11, 2018

(30) Foreign Application Priority Data

Apr. 5, 2017 (CH) .................................. 170000455

(51) Int. Cl.
| | |
|---|---|
| *B60L 11/00* | (2006.01) |
| *B60L 11/18* | (2006.01) |
| *H02J 7/00* | (2006.01) |
| *H01M 10/42* | (2006.01) |
| *H04L 12/40* | (2006.01) |

(52) U.S. Cl.
CPC ....... *B60L 11/1866* (2013.01); *H01M 10/425* (2013.01); *H02J 7/0021* (2013.01); *H04L 12/40195* (2013.01); *H01M 2010/4271* (2013.01); *H01M 2010/4278* (2013.01); *H01M 2220/20* (2013.01); *H02J 2007/0098* (2013.01); *H04L 2012/40215* (2013.01)

(58) Field of Classification Search
CPC ........... B60L 11/00; H01M 10/00; H02J 7/00; H04L 12/00

USPC .......................................................... 307/9.1
See application file for complete search history.

(56) References Cited

U.S. PATENT DOCUMENTS

| | | | |
|---|---|---|---|
| 6,078,165 | A | 6/2000 | Ashtiani et al. |
| 6,108,347 | A | 8/2000 | Holmquist |
| 7,706,398 | B2 | 4/2010 | Jung et al. |
| 8,281,051 | B2 | 10/2012 | Hartwich |
| 8,341,449 | B2 | 12/2012 | Daniel et al. |
| 9,436,261 | B2 * | 9/2016 | Yun ...................... G06F 1/3212 |

(Continued)

FOREIGN PATENT DOCUMENTS

| | | |
|---|---|---|
| CN | 105711434 A | 6/2016 |
| CN | 205377342 U | 7/2016 |

(Continued)

OTHER PUBLICATIONS

Hsu, et al. "On the Implemenation of CAN Buses to Battery Management Systems", Department of Electrical Engineering, National Central University, Taiwan, 2011, in 4 pages.

(Continued)

*Primary Examiner* — Rexford Barnie
*Assistant Examiner* — Joseph Inge
(74) *Attorney, Agent, or Firm* — Knobbe, Martens, Olson & Bear LLP (57) ABSTRACT

A circuit can include a CAN bus and multiple nodes. The multiple nodes can reboot at the same time so that a Time 0 is set at boot for each node. Each node can store an ID node and determine from its ID node one time slot of a plurality of periodic time slots starting from Time 0 in which to transmit on the CAN bus. Each node can transmit messages on the CAN bus in its determined time slot subsequent to Time 0.

30 Claims, 6 Drawing Sheets

(56) References Cited

U.S. PATENT DOCUMENTS

| | | | |
|---|---|---|---|
| 9,564,762 B2* | 2/2017 | Lee | H02J 7/0016 |
| 2005/0162172 A1* | 7/2005 | Bertness | G01R 31/3627 |
| | | | 324/426 |
| 2012/0268069 A1* | 10/2012 | Park | H01M 10/4207 |
| | | | 320/116 |
| 2014/0035357 A1 | 2/2014 | Hausmann et al. | |
| 2015/0019771 A1* | 1/2015 | Greef | H01M 10/425 |
| | | | 710/105 |
| 2015/0263546 A1* | 9/2015 | Senoo | H02J 3/32 |
| | | | 320/134 |
| 2016/0359329 A1 | 12/2016 | Kim et al. | |
| 2018/0012484 A1* | 1/2018 | Sakabe | G08C 17/00 |

FOREIGN PATENT DOCUMENTS

| | | |
|---|---|---|
| DE | 102013217458 | 3/2015 |
| WO | WO 03/026201 | 3/2003 |

OTHER PUBLICATIONS

Honghu, "Charging Stations for Electric Vehicles in Europe, Japan, China and USA", School of Industrial and Information Engineering Master of Science in Electrical Engineering, Milan, Italy 2015-2016, in 107 pages.

Huang, et al. "Research on the Real-Time Performance of Power Lithium Battery Assembly Line Based on Can Bus", School of Mechatronics Engineering, University of Electronics Science and Technology of China, China, in 7 pages.

Liu, et al. "A Multi-Module Battery System Based on MODBUS for a Hybrid Aircraft" College of Engineering Embry-Riddle Aeronautical University, Florida, USA, 2012, in 6 pages.

International Search Report for International Application No. PCT/IB2018/052284, dated Jul. 4, 2018, in 7 pages.

Written Opinion for International Application No. PCT/IB2018/052284, dated Jul. 4, 2018, in 9 pages.

Williams, A., et al., "ESCAN—An Open Source, High Bandwidth, Event Scheduled Controller Area Network", CAN in Automation, SAE Technical Paper Series, vol. 1, Apr. 12, 2011, in 10 pages.

Liangfei, Xu, et al., "Distributed control system based on CAN bus for fuel cell/battery hybrid vehicle" IEEE International Symposium on Industrial Electronics, (ISIE 2009), Piscataway, NJ, Jul. 5, 2009, pp. 183-188.

Saha, Indranil et al., "Formal Verification of Fault-Tolerant Startup Algorithms for Time-Triggered Architectures: A Survey", Proceedings of the IEEE, New York, vol. 104, No. 5, May 1, 2016, pp. 904-922.

Lin, Chin et al., "Development of Time Triggered Hybrid Data Bus System for Small Aircraft Digital Avionic System", Digital Avionics Systems Conference, Taiwan, IEEE, Oct. 1, 2007, in 12 pages.

Fuhrer, Thomas, et al., "Time Triggered Communication on CAN", Proceedings of the International CAN Conference, Jan. 1, 2000, in 8 pages.

Clarke Sean et al., "Nasa Sceptor electric concept aircraft power system: X-plane electric propulsion system design and qualification for crewed flight testing", 2016 IEEE Transportation Electrification Conference and Expo (ITEC), IEEE, Jun. 27, 2016.

* cited by examiner

Fig. 6 ns, or 250 nodes, 500 nodes, 750 nodes, 1000 nodes, or more nodes. As a result,

COMMUNICATION SYSTEM FOR BATTERY MANAGEMENT SYSTEMS IN ELECTRIC OR HYBRID VEHICLES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is related to a method and circuit for transmitting data in a deterministic way over a communications bus, such as a controller area network (CAN) bus. More particularly, the present disclosure is related to the use of communications bus for transmitting battery cell related data to and from a plurality of battery management systems.

Description of the Related Art

Battery packs including a plurality of battery cells, such as lithium-ion cells, have been used in electric cars, electric aircrafts, and other electric self-powered vehicles. The battery cells are connected in series or in parallel to deliver the required voltage and current. A central control system may be used to monitor operations of the battery cells.

For systems that utilize numerous battery cells, the software or hardware for monitoring such systems tends to be complicated. This complicated software or hardware has unfortunately made incorporating numerous battery cells into vehicles difficult.

SUMMARY

The present disclosure provides improved, simplified, and fail safe systems and methods for controlling multiple battery systems. For example, electric or hybrid vehicle, such as an aircraft, can include a multicomponent system with multiple nodes. The multiple nodes can each include a battery management system and a battery cell or battery pack. Each battery management system can monitor or control various parameters of the battery cell or battery pack, such as the temperature or voltage, and may be used to prevent overtemperature, overvoltage, undervoltage, or other conditions that may damage the battery cell or battery pack of its node. The battery management systems of the nodes can communicate via a communication medium, such as a bus structure like a CAN bus, with one another, as well as with a central monitoring unit that may control (for example, by activating, deactivating, or adjusting supply of power by) or interrogate (for example, temperature or voltage) one or more operations of the nodes.

Under some conditions one or more of the battery cells or battery packs may reach a low-voltage threshold even though other battery cells or battery packs of the vehicle have not yet reached the low-voltage threshold. This may be due to factors such as differences in self-discharge among the battery cells or battery packs. To respond to such issues or in other situations, the central monitoring unit can control individual battery management systems and may adjust a timing or a level of power supplied to the vehicle by individual nodes to prevent overtemperature, overvoltage, undervoltage, or other conditions that may damage the battery cell or battery pack of its node. The central monitoring unit may moreover compensate for disparities between nodes by orchestrating battery cell balancing based on voltage information from the battery management systems of the nodes.

The multicomponent system can desirably support the simultaneous operation of a relatively large number of nodes, such as 40 or more nodes, such as 40 nodes, 50 nodes, 60 nodes, 75 nodes, 100 nodes, 200 nodes, or 250 nodes, 500 nodes, 750 nodes, 1000 nodes, or more nodes. As a result, for example, where each node includes the battery management system and the battery cell or battery pack, the multicomponent system can support more battery management systems and battery cells or battery packs than other system designs, and thus enable large vehicles to operate partly, mostly, or fully by power supplied from batteries.

The present disclosure provides a deterministic method and circuit for transmitting data over a CAN bus or other communication bus. The present disclosure simplifies communications and significantly improves robustness.

The present disclosure provides a new battery management approach for using a communications bus, such as a CAN bus, where the battery management reliably supports battery packs having a large number of battery cells, such as more than 40 cells or even 100 cells.

The present disclosure provides a communication bus that operates using a deterministic protocol instead of random protocol.

The present disclosure provides that two nodes on a communication bus can avoid sending communications on the CAN bus at the same time, by using a pre-determined ID-correlated Time division multiple access (TDMA).

Although examples described herein may refer to a CAN bus, the examples may refer to a CAN bus to assist with understanding disclosed features and can similarly apply to other bus structures or other communication mediums or channels.

In addition, although examples described herein may discuss features in the context of nodes that perform battery management operations, one or more nodes can additionally or alternatively perform operations other than battery management and receive and transmit information other than battery management related information via a communication bus. For instance, one or more nodes can control sensors, valves, or electric engines and, in turn, may receive or transmit information related to the sensors, valves, or electric engines via the communication bus. In one example implementation, a node can include a sensor, and the node may transmit over a CAN bus sensor information including temperature, pressure, voltage, current, acceleration, angles, or strains.

DETAILED DESCRIPTION

System Overview

Figure 1A:
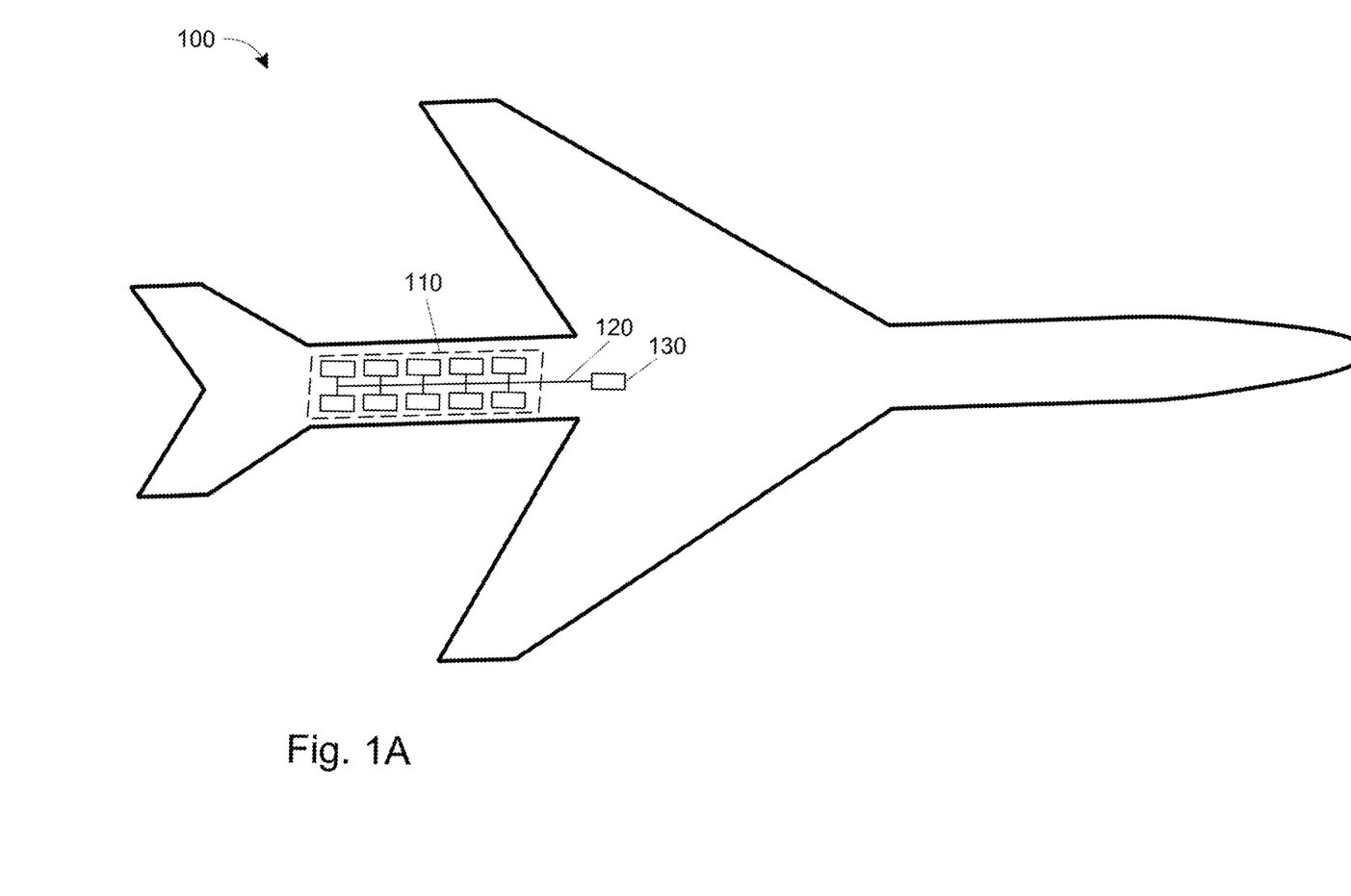
FIG. 1A illustrates an example aircraft with power management.

FIG. 1A illustrates an aircraft 100, such as an electric or hybrid aircraft, that includes battery management nodes 110, a communication medium 120, and a central monitoring unit 130. The battery management nodes 110 can communicate with one another via the communication medium 120, as well as with the central monitoring unit 130. The central monitoring unit 130 can monitor or control operations of the battery management nodes 110, such as with information received from the battery management nodes 110 via the communication medium 120. The battery management nodes 110 can together supply power to components of the aircraft 100 to power the aircraft 100.

The communication medium 120 can have a bus structure, such as a CAN bus, or may be another type of shared communication channel. The communication medium 120 can facilitate successful transmission by one device, such as the central monitoring unit 130 or an individual battery management node of the battery management nodes 110, on the communication medium 120 at one time. However, the communication medium 120 may not facilitate successful transmission by multiple devices, such as two or more of the individual battery management nodes of the battery management nodes 110 on the communication medium 120 at one time due to interference between multiple simultaneous transmissions on the communication medium 120. Those of the battery management nodes 110 and the central monitoring unit 130 that are not transmitting can receive transmissions on the communication medium 120.

Figure 1B:
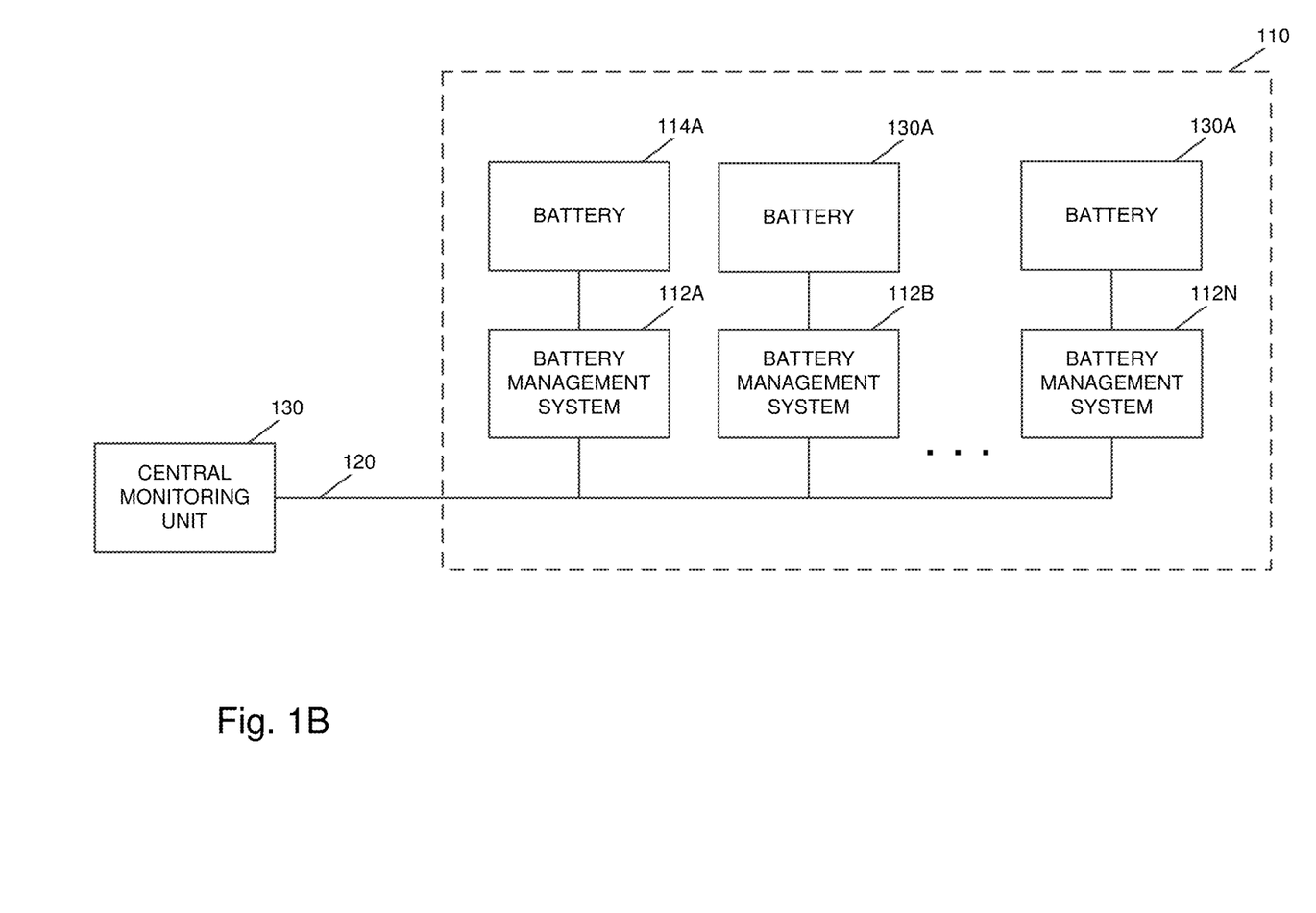
FIG. 1B illustrates example components of the aircraft of FIG. 1A.

FIG. 1B illustrates a detailed depiction of the battery management nodes 110 of the aircraft 100 of FIG. 1A. The battery management nodes 110 can include battery management systems 112A, 112B, . . . , 112N and batteries 114A, 114B, . . . , 114N. The batteries 114A, 114B, . . . , 114N can each include a battery cell, a battery pack, multiple battery cells, or multiple battery packs. A total number of nodes in the battery management nodes 110 can, for example, be or range between one or more of 2 nodes, 5 nodes, 10 nodes, 20 nodes, 40 nodes, 50 nodes, 60 nodes, 75 nodes, 100 nodes, 160 nodes, 200 nodes, or 250 nodes, 500 nodes, 750 nodes, 1000 nodes, greater than 1000 nodes, among other possible numbers of nodes.

As can be seen from FIG. 1B, one of the battery management systems 112A, 112B, . . . , 112N and one of the batteries 114A, 114B, . . . , 114N can together form a node connected to the communication medium 120. For example, the battery management system 112A and the battery 114A may together form a node on the communication medium 120, and the battery management system 112B and the battery 114B may together form another node on the communication medium 120.

The central monitoring unit 130 can display or control a state of individual of the battery management systems 112A, 112B, . . . , 112N or the batteries 114A, 114B, . . . , 114N based on communications on the communication medium 120 with the battery management systems 112A, 112B, . . . , 112N. Additionally or alternatively, the central monitoring unit 130 can control connection or disconnection of individual battery management systems 112A, 112B, . . . , 112N from the communication medium 120 (such as using a numerical circuited connected to and controlling a galvanic isolation).

Implementation of a Deterministic CAN Bus

A deterministic CAN bus communication system or method can provide one or more advantages including:
  The bus is communicating faster than in other systems.
  More nodes can be connected on the same bus than in other systems.
  The bus is more immune in case of external interferences than are other systems.
  No master is required for the system to operate, although one can be used.

At least some implementations described herein can optimize the power consumption of the nodes connected to a bus.

TDMA (time division multiple access) can be used so that NodeID N+1 will not try to send at same time as NodeID N but in a different time slot.

Each CAN bus node can have an ID (sometimes referred to as an ID node) defining the message priority. The ID can be assigned at manufacture or initialization of the node and may be stored in a memory device of the node. This ID can be multiplied by a time constant to define when the node may transmit. Of course, the nodes may further be synchronised and have the same Time 0.

There are several ways to synchronise the nodes:
  Sync signal from master is Time 0, or in case of master failure, another node can send this sync signal for redundancy purposes.
  External trigger signal sent from the master or any other device.
  If all the nodes are rebooted (for example, powered on or reset) at the same time, Time 0 can be set at boot.

Figure 2:
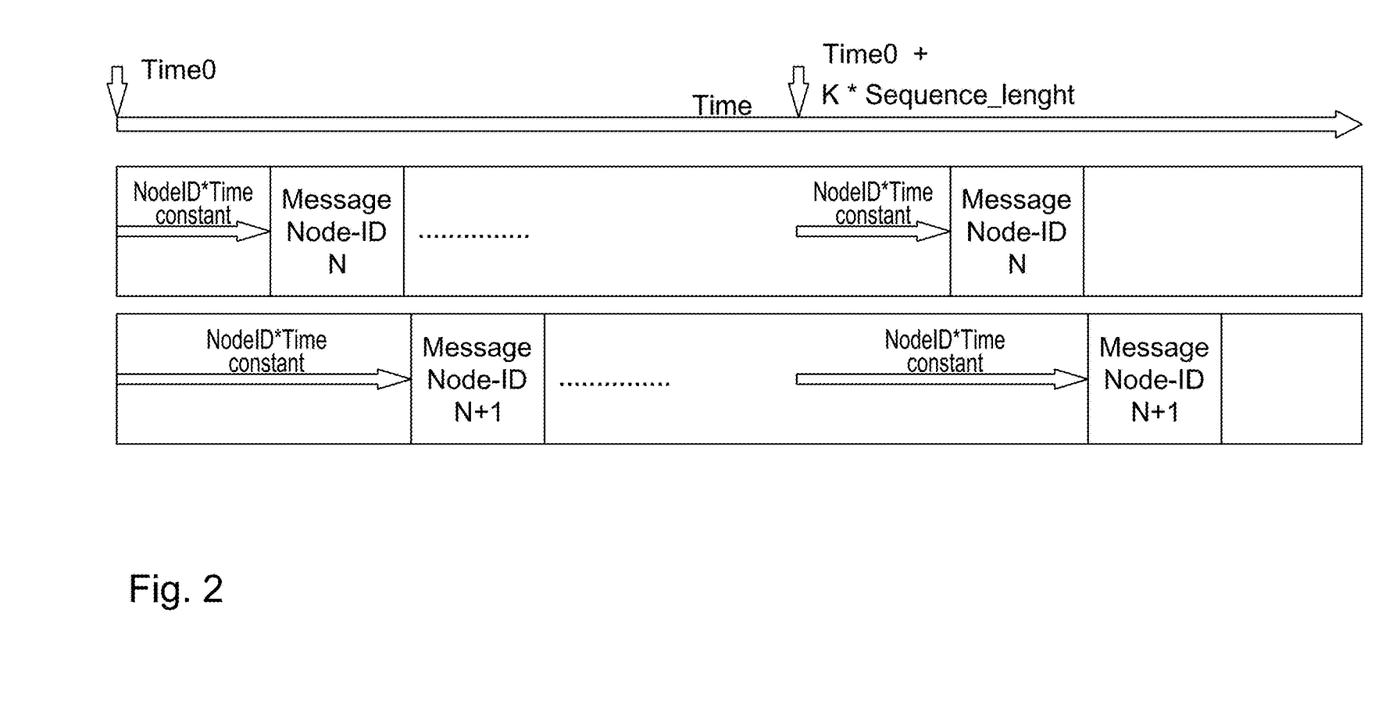
FIGS. 2, 3, and 4 illustrate example timings of transmissions on a communication medium in the aircraft of FIG. 1A or 1B.

FIG. 2 illustrates an example where a node N sends or receives messages during a first slot periodically starting at time 0+k*sequence_length, while node N+i sends or receives messages during the next slot periodically starting at time i*Time_constant+k*sequence_length, where Time_constant is the pitch between two successive slots and sequence_length is the duration of the periodic sequence. The duration of the periodic sequence can, for example, be 100 ms if we want each node to send 10 messages/second. In other implementations, the duration of the periodic sequence can be shorter or longer than 100 ms, such as being or ranging between one or more of 1 ms, 2 ms, 5, ms, 10 ms, 50 ms, 100 ms, 200 ms, 300 ms, 500 ms, 750 ms, 1 s, 1.5 s, 2 s, 3 s, 5 s, 7 s, or 10 s, among other possible durations.

The slot used by each node in the sequence can be a multiple of its Node ID, but another pre-programmed number in the node can be used in other implementations.

Coping with Desynchronization

In case Time 0 is defined at boot, nodes can sometimes desynchronise over time. This desynchronization can be highly dependent on the oscillator quality of the node. This however may not endanger the communication. In situations where the two nodes to not transmit at the same time, the embedded arbitration of the CAN bus can be used to address the desynchronization. This will likely solve most desynchronization cases because the probability is very low that two nodes send at the same time.

Even if high desynchronization, or two nodes sending at the same time, is not probable, it may be a requirement for aviation certification that any desynchronization be addressed. In this case, the following mechanism can be implemented.

Figure 3:
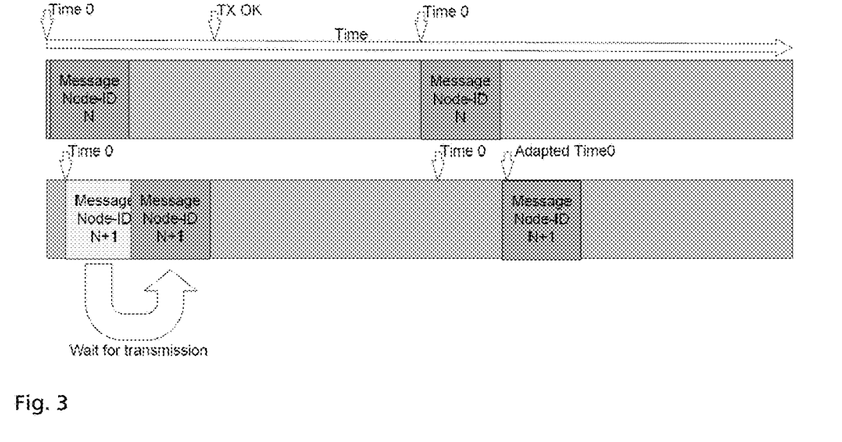

If because of desynchronization, NodeID N+1 is sending while NodeID N is already transmitting, NodeID N+1 can just wait until the bus is free again. But the node knows that it had to wait and can readapt its phase to adjust the next Time 0. This is illustrated in FIG. 3.

Figure 4:
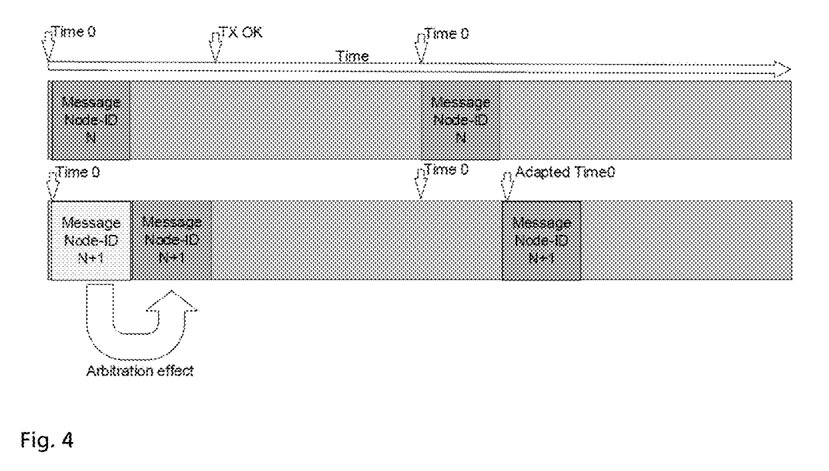

This mechanism will also address the situation if two nodes are sending exactly at the same time, as illustrated on FIG. 4. Each node can thus take advantage of the CAN bus arbitration to recalibrate the next Time 0 and sending slot.

It is also possible for the master to send one single sync signal on the bus to resynchronise the nodes.

It is also possible to reboot the nodes with a signal, such as with a power down/power up sequence or reset sequence.

This may be particularly useful in implementations where the nodes are booting quickly such as in less than 0.1 ms, 0.5 ms, 1 ms, 2 ms, 5 ms, or 10 ms. Fast boot times can be made possible by using nodes that have no operating system or are running code that was written by a programmer in an assembly language rather than an object-oriented language.

Power and Bus Optimization

Figure 5:
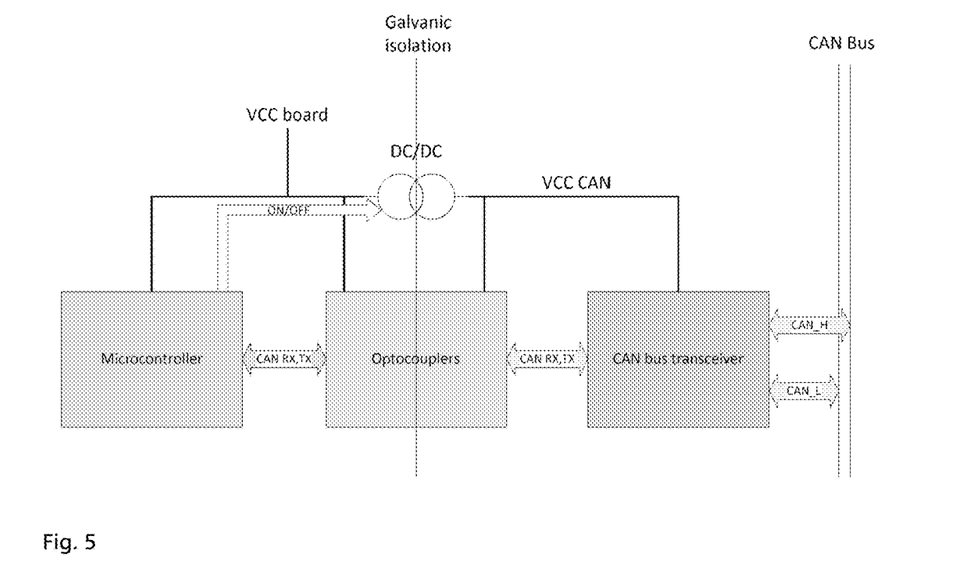
FIG. 5 illustrates an example commination system with galvanic isolation, which may be part of the aircraft of FIG. 1A or 1B.

A galvanic isolation can be implemented, such as illustrated in FIG. 5. This may be advantageous, in certain instances, such as when the CAN bus is used to measure a high voltage system, such as cell voltages in a battery pack. The galvanic isolation can help ensure that the high voltage system is not coupled to the rest of the installation through the CAN bus.

This isolation can be implemented using a DC/DC converter for the power (for example, to isolate Vcc supply voltage of the board from Vcc supply voltage of the CAN bus) and optocouplers or a galvanically isolated CAN bus transceiver for signals.

Some CAN bus drivers set their output to high impedance when not powered. The present disclosure takes advantage of this functionality. When the node may not be sending or receiving messages, the microcontroller can shut down the DC/DC converter, thus resulting in shutting down of the CAN bus transceiver too.

This can be implemented without galvanic isolation by un-powering the CAN bus transceiver.

This can reduce the number of nodes connected to the bus while also decreasing the power consumption of the node.

This functionality can be coupled to the above described TDMA CAN bus.

Communication Control Process

Figure 6:
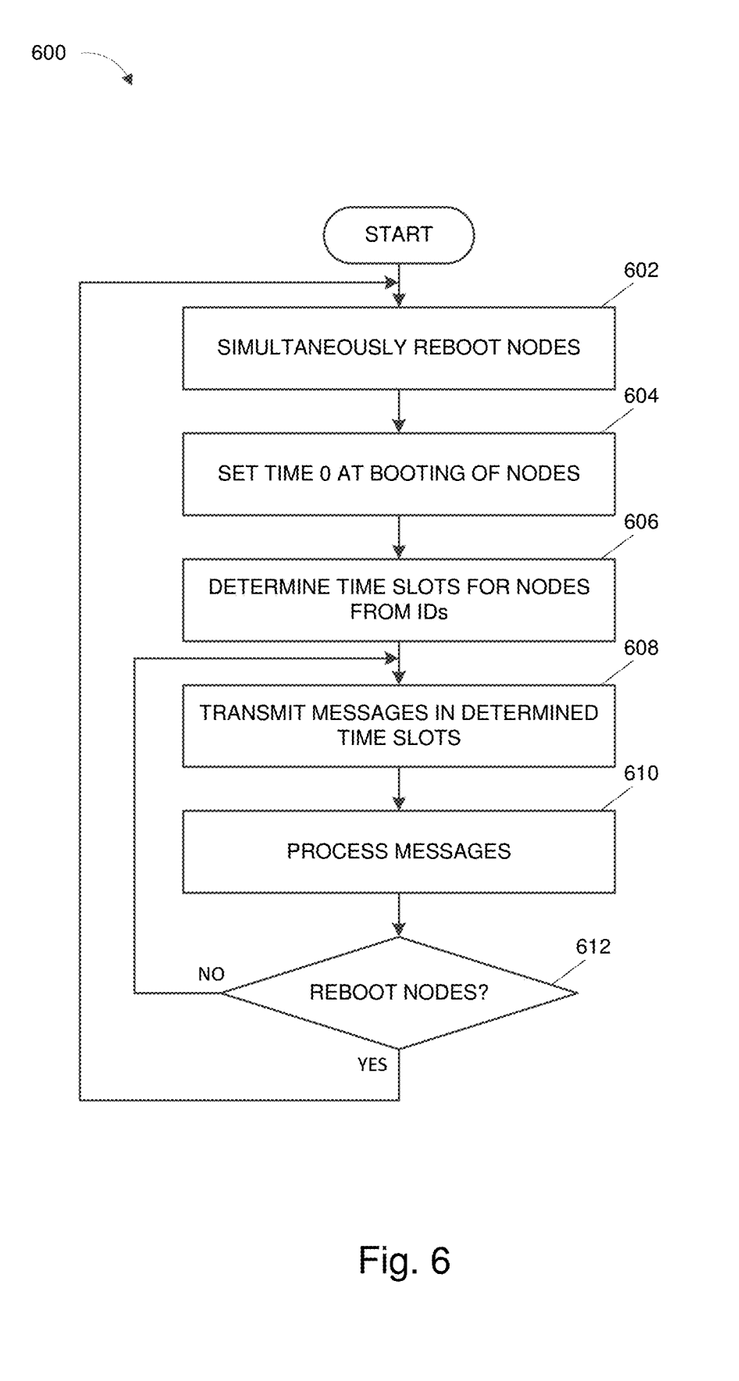
FIG. 6 illustrates a process for controlling communication on a communication medium.

FIG. 6 illustrates a communication control process 600 that can be performed by a system, such as the aircraft 100 of FIG. 1A. Although the communication control process 600 may be described in the context of the aircraft 100, the communication control process 600 can be performed by other systems. The communication control process 600 advantageously can facilitate a reliable, efficient, and balanced use of a shared communication channel like the communication medium 120 by multiple nodes, such as the battery management nodes 110, of the system. The nodes can each be permitted to have consistent and frequent access to the shared communication channel without the system including the communication overhead of transmissions on the shared communication medium or another communication channel to assign timings for the nodes to transmit on the shared communication channel.

At block 602, the nodes can reboot simultaneously. For example, the battery management nodes 110 can be caused to reboot, such as power on or reset, at the same time responsive to a received a power down signal, power up signal, or reset signal at each of the battery management nodes 110. The power down signal, power up signal, or reset signal may be received at the same time to synchronize the reboot or may instead contain timing information to trigger the nodes to synchronize reboot at a later time.

At block 604, the nodes can set Time 0 at booting. For example, the battery management nodes 110 can each store a common value for Time 0 at booting as a result of booting simultaneously. The common value for Time 0 may provide a shared reference timing among the battery management nodes 110 so that the battery management nodes 110 are initialized with respect to a common reference time. Moreover, until the setting of Time 0, the battery management nodes 110 may all contain identical components and software or nearly identical components and software to ensure that a value set by each of the battery management nodes 110 for Time 0 may be as similar as possible.

At block 606, the nodes can determine, from unique identification codes (IDs) assigned to the nodes, time slots in which to transmit. These unique identification codes may be assigned during manufacture and may be non-changeable. The unique identification codes can be identifiers that are included in communications by the nodes and usable to individually identify which one of the nodes transmitted a particular communication. For example, the battery management nodes 110 can each be assigned an ID different from the IDs of the other of battery management nodes 110 and may determine the dedicated time slot as a function of its assigned ID. The battery management nodes 110 can each determine a dedicated time slot in which to transmit on the communication medium 120 that may be different from the dedicated time slots determined by the other of battery management nodes 110. The dedicated time slots can be relative to Time 0 set at booting of the battery management nodes 110 so that a reference timing for the dedicated time slots synchronized across the battery management nodes 110 without the overhead of the battery management nodes 110 receiving or processing a timing synchronization signal.

At block 608, the nodes transmit one or more messages on the communication medium in the determined time slots. For example, one or more of the battery management nodes 110 can each transmit on the communication medium 120 in its dedicated time slot a message that includes monitor or control parameters for its battery management node.

At block 610, the messages transmitted by the nodes can be processed. For example, the central monitoring unit 130 can process the messages received on the communication medium 120 from the battery management nodes 110. The central monitoring unit 130 can process the messages to monitor a status of the battery management nodes 110 and accordingly control operations of each of the battery management nodes 110.

At block 612, it can be determined whether to reboot the nodes. For example, one of the battery management nodes 110, the central monitoring unit 130, or another device of the aircraft 100 can determine whether to reboot the battery management nodes 110 by cycling the power of or resetting the battery management nodes 110. The nodes may be determined to be rebooted when a threshold duration of time has passed (for instance, 50 ms, 100 ms, 200 ms, 500 ms, 1 s, 2 s, 5 s, 10 s, 1 m, 5 m, 10 m, or another duration) or upon occurrence of an event (for instance, detection of an interfering transmission or an attempted interfering transmission on the communication medium 120). The threshold duration of time or the events can vary over time and may depend on an operating condition of the system.

If it is determined at block 612 not to reboot the nodes, the communication control process 600 returns to block 608, and the nodes continue to transmit one or more messages on the communication medium in the determined time slots.

On the other hand, if it is determined at block 612 to reboot the nodes, the communication control process 600 moves again to block 602, and the nodes are rebooted simultaneously.

Rebooting is advantageous because the software running on the processor is fully reset. This often eliminates any errant code that may be running on the nodes. Sending, for example, a timing synchronization signal without a full reset can synchronize clocks, but if a node is running an error in its software, the synchronization signal may not solve the problem. Quick rebooting is made possible through the use of simplified code running on the nodes. For example, the nodes may be programmed directly in machine code using an assembly language and may operate without executing an operating system. Further the code can be kept uniform or nearly uniform across the nodes and made as simple as possible to reduce reboot delays.

The communication control process 600 can further support successful functioning of the system by causing occasional clearing of read/write memories of system components, such as the read/write memory devices of the battery management nodes 110. The clearing of the read/write memories and restoring of software using dedicated read only memories can ensure that no remaining or corrupted data is retained by the battery management nodes 110 that may cause operational errors in the system.

Optionally, the communication control process 600 can facilitate resynchronization of the nodes without cycling the power of or resetting the nodes. In one example, one of the nodes can attempt to transmit on the communication medium and detect that another of the nodes is attempting to transmit or already transmitting on the communication medium. The node that detected another node attempting to transmit or already transmitting can, in turn, adjust its phase to a next Time 0, thereby again resynchronizing the node with the other nodes. In another example, one of the components of the system can send a synchronization signal, such as on the communication medium, to resynchronize one or more of the nodes. The synchronization signal may be provided periodically or responsive to occurrence of an event.

The communication control process 600 can also assist with compliance to certain certification standards. In many applications including in the aviation, random bus access that results in an unpredictable transmission times is undesirable. The communication control process 600 advantageously provides a communication approach in which the nodes transmit in a predetermined message sequence with deterministic access time.

Although some examples explained in connection with the communication control process 600 or elsewhere herein may describe one or more nodes as performing battery management functionality, one or more nodes can perform additional or alternative functionality other than battery management. For example, the one or more nodes can include a system that performs one or more of the following functions: braking operation, engine control, engine monitoring, device cooling, oil management, exhaust management, fuel supply, suspension control, steering control, transmission management, stabilization control, landing gear operation, communication system management, user interface control, or battery management. Moreover, the one or more nodes can additionally or alternatively monitor or control sensors, valves, electric engines, and the like. Further, the one or more nodes can additionally or alternatively transmit sensor information, such as temperature, pressure, voltage, current, acceleration, angles, strains, and the like, as part of the communication control process 600.

Example Implementations

Disclosed herein is a method for sharing a CAN bus between a plurality of nodes, wherein an ID node is assigned to each node. The method including dividing a CAN channel into a plurality of periodic time slots, assigning one of those time slots to each node, and having the nodes sending and/or receiving messages one after the other, each using its assigned time slot.

The method of the preceding paragraph can include one or more of the following features: The time slot assigned to a node is defined by multiplying the ID node of the node with a time constant. The time slot assigned to a node is defined based on the ID node of the node. The method including a step of synchronizing different nodes. The step of synchronizing including sending a synchronizing signal or a trigger signal to each synchronized node. The step of synchronizing including: powering all nodes at the same power-on time (t0); using said power-on time for synchronizing the nodes. The method further including: detecting collisions between messages sent from different nodes; resynchronizing at least one node in case of such a collision. The step of resynchronizing including rebooting all nodes. The method further including providing a galvanic isolation between each node and said CAN bus. The galvanic isolation including a transformer. The galvanic isolation including an optocoupler. The galvanic isolation including a transformer for power signals and an optocoupler for data signals. Each node including a bus driver. The galvanic isolation being provided between said driver and said bus. The method including steps of disconnecting and reconnecting said nodes to said bus by controlling said isolation. The method including a step of controlling each isolation with a numerical circuit in each node. The method including a step of controlling each isolation from a central control system. At least some nodes including a battery management system for monitoring and/or controlling a single battery cell in a battery pack.

Disclosed is a circuit including: a CAN bus; a plurality of nodes, each node storing an ID node; each node being arranged for sending messages only during a periodic time slot assigned to this node only.

The circuit of the preceding paragraph can including one or more of the following features: The nodes being synchronized. The nodes being arranged for receiving a synchronizing signal or a trigger signal and to adapt a phase of a clock to said signal. The nodes being arranged for using a power-on time for said synchronization. The nodes being further arranged for: detecting collisions with messages from other nodes; resynchronizing in case of such a collision. The step of resynchronizing including rebooting. A galvanic isolation being provided between each node and said CAN bus. The galvanic isolation including a transformer. The galvanic isolation including an optocoupler. The galvanic isolation including a transformer for power signals and an optocoupler for data signals. Each node including a bus driver. The galvanic isolation being provided between said driver and said bus. The galvanic isolation being operable to disconnect the node from said CAN bus. The circuit further including a numerical circuit in each node for controlling the connection or disconnection of said galvanic isolation. The circuit further including a central control system for controlling the connection or disconnection of said galvanic isolation in each node. At least some nodes including a battery management system for monitoring and/or controlling a single battery cell in a battery pack. Each node including a single battery cell. A battery management system including the circuit of claim 34. The circuit further including a central monitoring unit connected to said CAN bus and arranged for displaying and/or controlling the state of at least some of said battery cells. An electric aircraft including the battery management system.

Disclosed is a method for sharing a CAN bus between a plurality of nodes, wherein each node is assigned an ID node. The method including: rebooting said plurality of nodes at the same time so that a Time 0 is set at boot for each node; by each node, determining from its ID node one time slot of a plurality of periodic time slots starting from said Time 0 in which to transmit on said CAN bus; and transmitting, by said plurality of nodes, messages on said CAN bus in said determined time slots subsequent to said Time 0.

The method of the preceding paragraph can include one or more of the following features: By each node, the one time slot is determined as a mathematical function of its ID node. By each node, the one time slot is determined by multiplying its ID node with a time constant. The method further including: detecting, by a first node of said plurality of nodes, that a second node of said plurality of nodes is already transmitting on said CAN bus while said first node is transmitting on said CAN bus; and resynchronizing at least said first node in response to said detecting. The resynchronizing including rebooting all nodes. The method further including periodically rebooting all nodes to resynchronise all nodes. The method further including isolating each node from said CAN bus with a galvanic isolation. The galvanic isolation including a transformer. The galvanic isolation including an optocoupler. The galvanic isolation including a transformer for power signals and an optocoupler for data signals. Each node including a bus driver. The galvanic isolation being between said bus driver and said CAN bus. The method further including disconnecting and reconnecting said plurality of nodes to said CAN bus by controlling said galvanic isolation. The method further including controlling each galvanic isolation with a numerical circuit in each node. The method further including controlling each isolation by a central control system. At least some nodes including a battery management system for monitoring or controlling a single battery cell in a battery pack.

Disclosed is a circuit including: a CAN bus; and a plurality of nodes configured to reboot at the same time so that a Time 0 is set at boot for each node, each node storing an ID node and configured to: determine from its ID node one time slot of a plurality of periodic time slots starting from said Time 0 in which to transmit on said CAN bus, and transmit messages on said CAN bus in its determined time slot subsequent to said Time 0.

The circuit of the preceding paragraph can include one or more of the following features: The plurality of nodes being configured to receive a synchronizing signal and adapt a phase of a clock to said synchronizing signal. Each node being configured to: while transmitting on said CAN bus, detect that another node is already transmitting on said CAN bus; and resynchronize subsequent to detecting that another node is already transmitting on said CAN bus. Each node being configured to resynchronize by rebooting. All nodes being configured to periodically reboot to resynchronise all nodes. The circuit further including a galvanic isolation between each node and said CAN bus. The galvanic isolation including a transformer. The galvanic isolation including an optocoupler. The galvanic isolation including a transformer for power signals and an optocoupler for data signals. Each node including a bus driver. The galvanic isolation being between said bus driver and said CAN bus. The galvanic isolation being configured to disconnect said plurality of nodes from said CAN bus. The circuit further including a numerical circuit in each node that is configured to control the connection or disconnection of said galvanic isolation. The circuit further including a central control system configured to control the connection or disconnection of said galvanic isolation in each node. At least some nodes each including a battery management system for monitoring or controlling a single battery cell in a battery pack. Each node including a single battery cell. The circuit further including a central monitoring unit connected to said CAN bus and configured to display or control the state of at least some of said battery cells. An aircraft including the circuit.

Disclosed is a vehicle including: a communication bus; and a plurality of battery management systems configured to communicate with one another via the communication bus and reboot at the same time so that a reboot time is set at boot of the plurality of battery management systems, the plurality of battery management systems including a first battery management system and a second battery management system. The first battery management system is configured to: determine from a first identifier a first time slot of a plurality of time slots starting from the reboot time in which to transmit via the communication bus, monitor a first battery, and subsequent to the reboot time, transmit a first message via the communication bus in the first time slot and not in the plurality of time slots other than the first time slot, the first message including first information about the first battery. The second battery management system is configured to: determine from a second identifier a second time slot of the plurality of time slots starting from the reboot time in which to transmit via the communication bus, the second identifier being different from the first identifier, monitor a second battery different from the first battery, the second battery and the first battery being configured to individually and together power an electronic device, and subsequent to the reboot time, transmit a second message via the communication bus in the second time slot and not in the plurality of time slots other than the second time slot, the second message including second information about the second battery.

The vehicle of the preceding paragraph can include one or more of the following features: The first battery management system and the second battery management are configured to periodically reboot at the same time. The first battery management system and the second battery management are configured to reboot at the same time at least once every first time duration. The first time duration is between 1 ms and 10 s. The first time duration is between 10 ms and 1 s. The first time duration is 100 ms. The vehicles further includes a central monitoring unit configured to periodically reboot the first battery management system and the second battery management system. The vehicle further includes a device management system configured to communicate via the communication bus and reboot at the same time as the plurality of battery management systems so that the reboot time is set at boot of the device management system, and the device management system is configured to: determine from a third identifier a third time slot of the plurality of time slots starting from the reboot time in which to transmit via the communication bus, the third identifier being different from the first identifier and the second identifier, perform a functionality not performed by the plurality of battery management systems, and subsequent to the reboot time, transmit a third message via the communication bus in the third time slot and not in the plurality of time slots other than the third time slot. The vehicles further includes a central monitoring unit configured to reboot the first battery management system and the second battery management at least once every first time duration. The first time duration is between 1 ms and 10 s. The first time duration is 100 ms. A total number of battery management systems in the plurality of battery management systems is at least 2 and no greater than 500. A total number of battery management systems in the plurality of battery management systems is at least 40 and no greater than 200. The first battery management system is configured to periodically transmit in the first time slot, and the second battery management system is configured to periodically transmit in the second time slot. When the first battery management system and the second battery management system are desynchronized after a period of time, the first battery management system is configured to detect a desynchronization between the first battery management system and the second battery management system from the first battery management system attempting to transmit while the second battery management system is transmitting. The first battery management system is configured to resynchronize with the second battery management system from detecting the desynchronization. The first identifier is based on a non-modifiable code provided to the first battery management system at manufacture. The vehicle further includes a central monitoring unit configured to: process the first information and the second information; and control the first battery management system and the second battery management system responsive to processing the first information and the second information. The vehicle further includes a central monitoring unit configured to: process the first information and the second information to determine a plurality of values; and output for presentation on a display the plurality of values. The plurality of battery management systems can reboot at the same time by powering off and then at the same time powering on. The plurality of battery management systems can reboot at the same time by resetting at the same time. The first battery management system includes a first field programmable gate array or a first application specific integrated circuit, and the second battery management system includes a second field programmable gate array different from the first field programmable gate array or a second application specific integrated circuit different from the first application specific integrated circuit. The vehicle further includes a housing of an airplane, a car, a truck or a boat, the housing being configured to support the communication bus and the plurality of battery management systems. The electronic device can be an airplane, a car, a truck, or a boat. The vehicle further includes: a first galvanic isolation between the first battery management system and the communication bus, the first galvanic isolation being configured to connect and disconnect the first battery management system from the communication bus; and a second galvanic isolation between the second battery management system and the communication bus, the second galvanic isolation being configured to connect and disconnect the second battery management system from the communication bus. The first battery management system includes a first memory device configured to store the first identifier, and the second includes a second memory device configured to store the second identifier, the second memory device being different from the first memory device. The communication bus includes a controller area network (CAN) bus. The first message comprises the first identifier, and the second message comprises the second identifier. The first identifier and the second identifier can be CAN bus identifiers, and individual frames of messages sent over the CAN bus may include the first identifier or the second identifier. The communication bus does not support successful communication by both the first battery management system and the second battery management at the same time. The first slot corresponds to a first multiple of the first identifier, and the second slot corresponds to a second multiple of the second identifier.

Disclosed is a method of operating a vehicle including a communication bus and a plurality of battery management systems, the method including: rebooting the plurality of battery management systems at the same time; setting a reboot time at boot of the plurality of battery management systems; determining, by a first battery management system of the plurality of battery management systems, from a first identifier a first time slot of a plurality of time slots starting from the reboot time in which to transmit via the communication bus; monitoring, by the first battery management system, a first battery; subsequent to the reboot time, transmitting, by the first battery management system, a first message via the communication bus in the first time slot and not in the plurality of time slots other than the first time slot, the first message including first information about the first battery; determining, by a second battery management system of the plurality of battery management systems, from a second identifier a second time slot of a plurality of time slots starting from the reboot time in which to transmit via the communication bus, the second identifier being different from the first identifier; monitoring, by the second battery management system, a second battery different from the first battery; subsequent to the reboot time, transmitting, by the second battery management system, a second message via the communication bus in the second time slot and not in the plurality of time slots other than the second time slot, the second message including second information about the second battery; and powering the vehicle with the first battery and the second battery.

The method of the preceding paragraph can include one or more of the following features: The method can further include periodically rebooting the first battery management system and the second battery management at the same time. The method can further include: periodically transmitting in the first slot with the first battery management system; and periodically transmitting in the second slot with the second battery management system. The method can further include detecting, by the first battery management system, a desynchronization between the first battery management system and the second battery management system from the first battery management system attempting to transmit while the second battery management system is transmitting. The method can further include resynchronizing the first battery management system with the second battery management system from detecting the desynchronization. The vehicle is an airplane, a car, a truck or a boat. The method can further include: connecting and disconnecting the first battery management system from the communication bus with a first galvanic isolation between the first battery management system and the communication bus; and connecting and disconnecting the second battery management system from the communication bus with a second galvanic isolation between the second battery management system and the communication bus.

Additional Embodiments and Terminology

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for instance, through multi-threaded processing, interrupt processing, or multiple processors or processor cores or on other parallel architectures, rather than sequentially. In addition, different tasks or processes can be performed by different machines or computing systems that can function together.

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, a microprocessor, a state machine, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

What is claimed is:

1. A communication system for battery management systems in a vehicle, the communication system comprising:
    a communication bus; and
    a plurality of battery management systems configured to communicate with one another via the communication bus and reboot at the same time so that a reboot time is set at boot of the plurality of battery management systems, the plurality of battery management systems comprising a first battery management system and a second battery management system,
    wherein the first battery management system is configured to:
        determine from a first identifier a first time slot of a plurality of time slots starting from the reboot time in which to transmit via the communication bus,
        monitor a first battery, and
        subsequent to the reboot time, transmit a first message via the communication bus in the first time slot and not in the plurality of time slots other than the first time slot, the first message comprising first information about the first battery,
    wherein the second battery management system is configured to:
        determine from a second identifier a second time slot of the plurality of time slots starting from the reboot time in which to transmit via the communication bus, the second identifier being different from the first identifier,
        monitor a second battery different from the first battery, the second battery and the first battery being configured to individually and together power an electronic device, and
        subsequent to the reboot time, transmit a second message via the communication bus in the second time slot and not in the plurality of time slots other than the second time slot, the second message comprising second information about the second battery.

2. The communication system of claim 1, wherein the first battery management system and the second battery management are configured to periodically reboot at the same time.

3. The communication system of claim 1, wherein the first battery management system and the second battery management are configured to reboot at the same time at least once every first time duration.

4. The communication system of claim 3, wherein the first time duration is between 1 ms and 10 s.

5. The communication system of claim 1, further comprising a device management system configured to communicate via the communication bus and reboot at the same time as the plurality of battery management systems so that the reboot time is set at boot of the device management system, wherein the device management system is configured to:
    determine from a third identifier a third time slot of the plurality of time slots starting from the reboot time in which to transmit via the communication bus, the third identifier being different from the first identifier and the second identifier, perform a functionality not performed by the plurality of battery management systems, and subsequent to the reboot time, transmit a third message via the communication bus in the third time slot and not in the plurality of time slots other than the third time slot.

6. The communication system of claim 1, further comprising a central monitoring unit configured to periodically reboot the first battery management system and the second battery management system.

7. The communication system of claim 1, further comprising a central monitoring unit configured to reboot the first battery management system and the second battery management at least once every first time duration.

8. The communication system of claim 7, wherein the first time duration is between 1 ms and 10 s.

9. The communication system of claim 7, wherein the first time duration is 100 ms.

10. The communication system of claim 1, wherein a total number of battery management systems in the plurality of battery management systems is at least 40 and no greater than 500.

11. The communication system of claim 1, wherein the first battery management system is configured to periodically transmit in the first time slot, and the second battery management system is configured to periodically transmit in the second time slot.

12. The communication system of claim 11, wherein when the first battery management system and the second battery management system are desynchronized after a period of time, the first battery management system is configured to detect a desynchronization between the first battery management system and the second battery management system from the first battery management system attempting to transmit while the second battery management system is transmitting.

13. The communication system of claim 12, wherein the first battery management system is configured to resynchronize with the second battery management system from detecting the desynchronization.

14. The communication system of claim 1, wherein the first identifier is based on a non-modifiable code provided to the first battery management system at manufacture.

15. The communication system of claim 1, further comprising a central monitoring unit configured to:
process the first information and the second information; and
control the first battery management system and the second battery management system responsive to processing the first information and the second information.

16. The communication system of claim 1, wherein the plurality of battery management systems is configured to reboot at the same time by powering off and then at the same time powering on.

17. The communication system of claim 1, wherein the plurality of battery management systems is configured to reboot at the same time by resetting at the same time.

18. The communication system of claim 1, wherein the first battery management system comprises a first field programmable gate array or a first application specific integrated circuit, and the second battery management system comprises a second field programmable gate array different from the first field programmable gate array or a second application specific integrated circuit different from the first application specific integrated circuit.

19. The communication system of claim 1, wherein the electronic device is an airplane, a car, a truck, or a boat.

20. The communication system of claim 1, further comprising:
a first galvanic isolation between the first battery management system and the communication bus, the first galvanic isolation being configured to connect and disconnect the first battery management system from the communication bus; and
a second galvanic isolation between the second battery management system and the communication bus, the second galvanic isolation being configured to connect and disconnect the second battery management system from the communication bus.

21. The communication system of claim 1, wherein the first battery management system comprises a first memory device configured to store the firstidentifier, and the second comprises a second memory device configured to store the second identifier, the second memory device being different from the first memory device.

22. The communication system of claim 1, wherein the communication bus comprises a controller area network (CAN) bus, and the first message comprises the first identifier and the second message comprises the second identifier.

23. The communication system of claim 1, wherein the communication bus does not support successful communication by both the first battery management system and the second battery management at the same time.

24. The communication system of claim 1, wherein the first slot corresponds to a first multiple of the first identifier, and the second slot corresponds to a second multiple of the second identifier.

25. A method of operating a vehicle comprising a communication bus and a plurality of battery management systems, the method comprising:
rebooting the plurality of battery management systems at the same time;
setting a reboot time at boot of the plurality of battery management systems;
determining, by a first battery management system of the plurality of battery management systems, from a first identifier a first time slot of a plurality of time slots starting from the reboot time in which to transmit via the communication bus;
monitoring, by the first battery management system, a first battery;
subsequent to the reboot time, transmitting, by the first battery management system, a first message via the communication bus in the first time slot and not in the plurality of time slots other than the first time slot, the first message comprising first information about the first battery;
determining, by a second battery management system of the plurality of battery management systems, from a second identifier a second time slot of a plurality of time slots starting from the reboot time in which to transmit via the communication bus, the second identifier being different from the first identifier;
monitoring, by the second battery management system, a second battery different from the first battery;
subsequent to the reboot time, transmitting, by the second battery management system, a second message via the communication bus in the second time slot and not in the plurality of time slots other than the second time slot, the second message comprising second information about the second battery; and powering the vehicle with the first battery and the second battery.

26. The method of claim 25, further comprising periodically rebooting the first battery management system and the second battery management at the same time.

27. The method of claim 25, further comprising:
periodically transmitting in the first slot with the first battery management system; and
periodically transmitting in the second slot with the second battery management system.

28. The method of claim 27, further comprising detecting, by the first battery management system, a desynchronization between the first battery management system and the second battery management system from the first battery management system attempting to transmit while the second battery management system is transmitting.

29. The method of claim 28, further comprising resynchronizing the first battery management system with the second battery management system from detecting the desynchronization.

30. The method of claim 25, further comprising:
connecting and disconnecting the first battery management system from the communication bus with a first galvanic isolation between the first battery management system and the communication bus; and
connecting and disconnecting the second battery management system from the communication bus with a second galvanic isolation between the second battery management system and the communication bus.

* * * * *

UNITED STATES PATENT AND TRADEMARK OFFICE
CERTIFICATE OF CORRECTION

PATENT NO. : 10,131,246 B2  
APPLICATION NO. : 15/943579  
DATED : November 20, 2018  
INVENTOR(S) : Sébastien Demont Page 1 of 1

It is certified that error appears in the above-identified patent and that said Letters Patent is hereby corrected as shown below:

On the Title Page

Item (30), under Foreign Application Priority Data, change "170000455" to --20170000455--.

In the Claims

Column 16, Line 19, in Claim 21, change "firstidentifier" to --first identifier--.

Signed and Sealed this
Twelfth Day of March, 2019

Andrei Iancu
*Director of the United States Patent and Trademark Office*